(No Model.) 3 Sheets—Sheet 1.
R. B. ROBBINS.
CORN OR CANE HARVESTER.
No. 515,483. Patented Feb. 27, 1894.
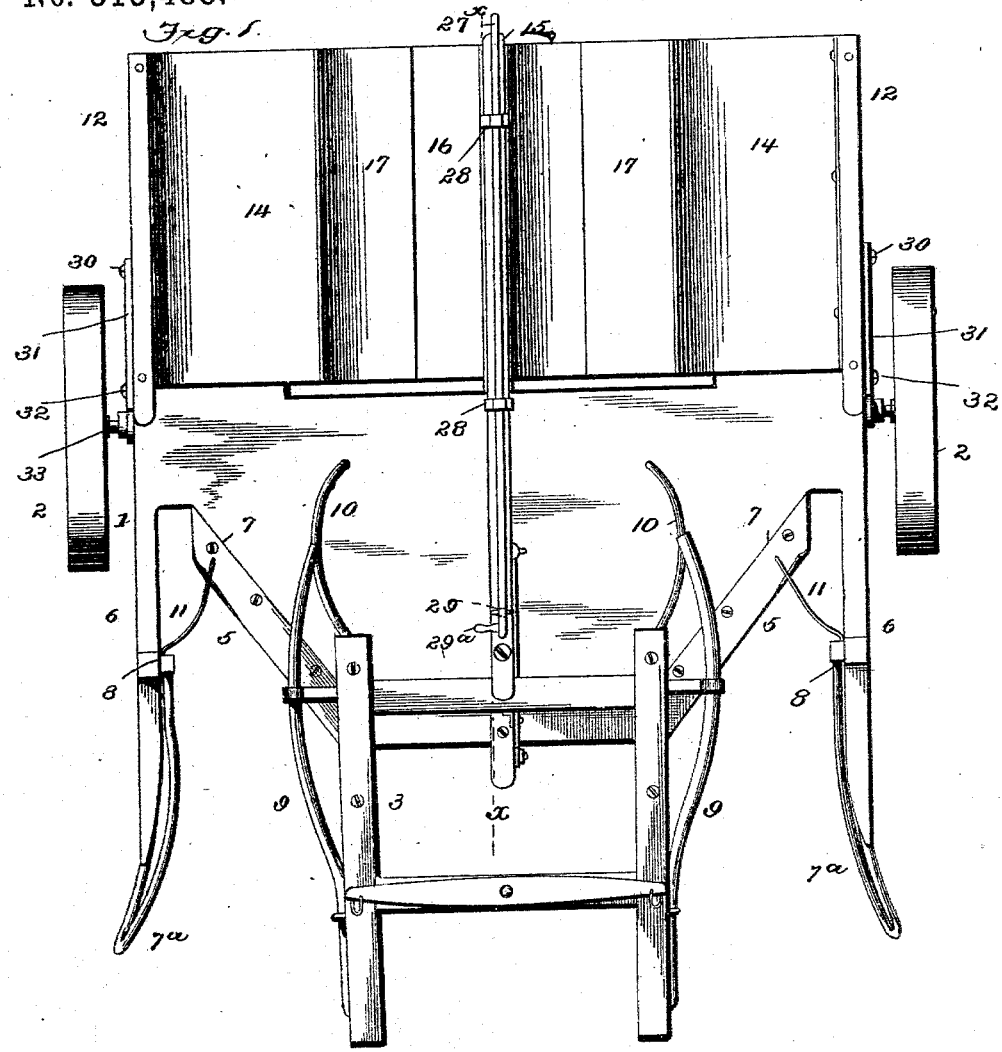
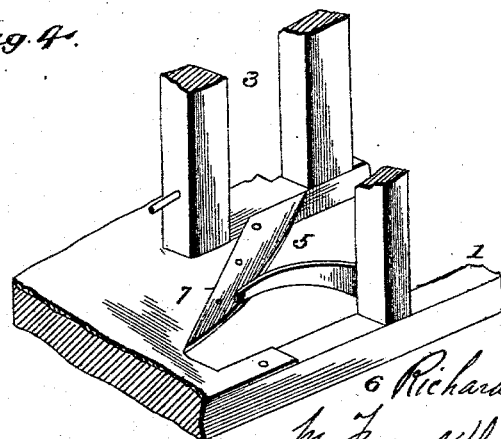
Witnesses
Inventor
Richard B. Robbins
by Franck W. Johns
Attorney (No Model.)  3 Sheets—Sheet 2.
R. B. ROBBINS.
CORN OR CANE HARVESTER.
No. 515,483. Patented Feb. 27, 1894.
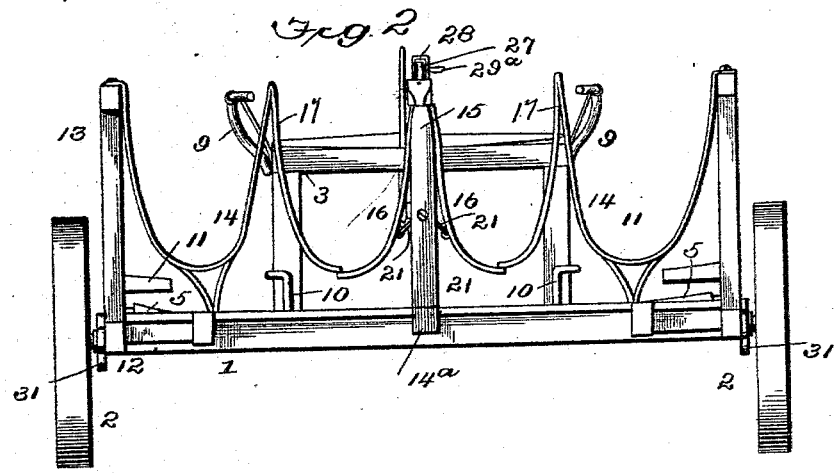
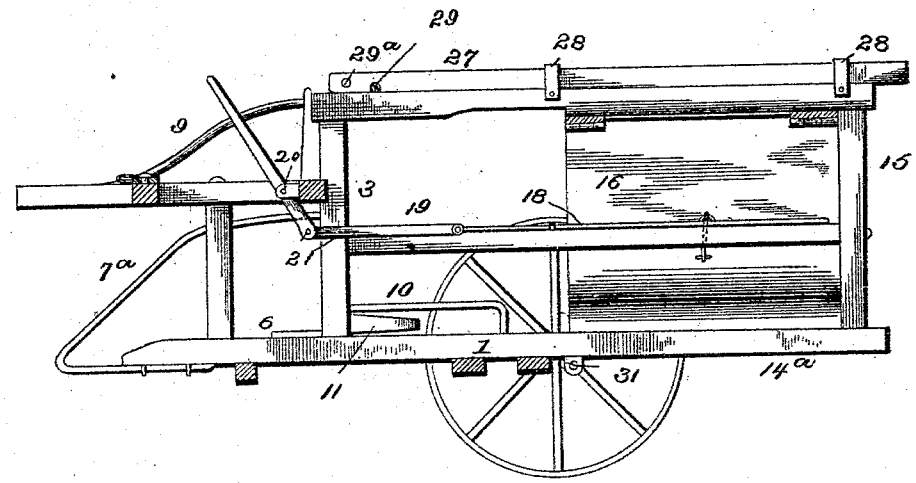
Witnesses
Inventor
Richard B. Robbins
by Franck D. Johns
Attorney (No Model.) 3 Sheets—Sheet 3.
R. B. ROBBINS.
CORN OR CANE HARVESTER.
No. 515,483. Patented Feb. 27, 1894.
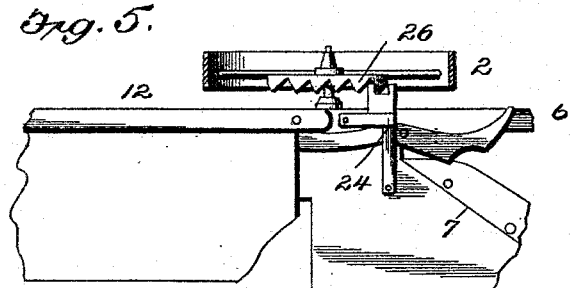
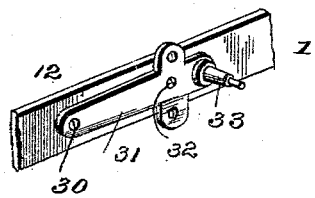
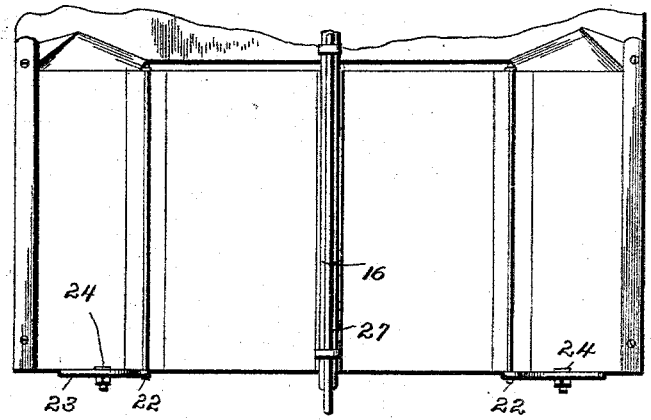
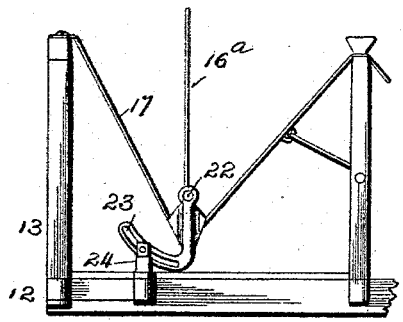
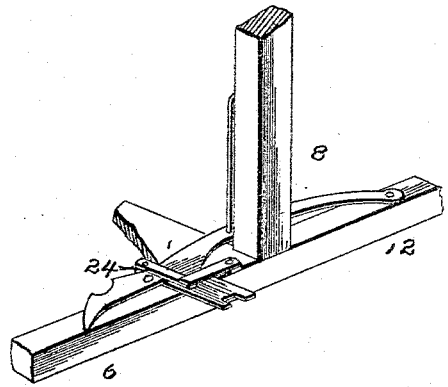

UNITED STATES PATENT OFFICE.

RICHARD B. ROBBINS, OF ADRIAN, MICHIGAN.

CORN OR CANE HARVESTER.

SPECIFICATION forming part of Letters Patent No. 515,483, dated February 27, 1894.

Application filed January 28, 1893. Serial No. 460,060. (No model.)

*To all whom it may concern:*

Be it known that I, RICHARD B. ROBBINS, a citizen of the United States, residing at Adrian, in the county of Lenawee and State of Michigan, have invented certain new and useful Improvements in Corn or Cane Harvesters; and I do hereby declare the following to be a full, clear, and exact description of the invention, such as will enable others skilled in the art to which it appertains to make and use the same.

My invention relates to certain improvements in corn and cane harvesters and has for its object to provide for simultaneously cutting two rows of corn or cane, collecting the stalks and guiding the same toward the cutting knives in such a manner that they may be readily handled by an operator or operators, when cut, and then deposited in suitable troughs or receptacles in quantities sufficient to form a quarter section of a shock, so that when a sufficient quantity has been accumulated in each receptacle or trough it may be transferred by the operator or operators, to the rear of the machine and by the aid of a suitable movable "horse," forming part of the machine, formed into shocks.

My invention also has for its object to construct and arrange the knives or cutters, so that, they will initially sever by a direct cut the outer shell of the stalks and then continue to give a shear cut to said stalks, whereby the operation of the machine will be facilitated.

The particular construction and arrangement of the various parts of my said invention, designed to accomplish the above mentioned objects, I will now proceed to point out, reference being had to the accompanying drawings, in which—

Figure 1 is a plan view of a harvester embodying my said invention; Fig. 2 a rear elevation thereof; Fig. 3 a longitudinal vertical section on the line $x$—$x$ of Fig. 1; Fig. 4 a detached perspective view of one of the cutters; Fig. 5 a plan view of a modification of my invention; Fig. 6 a plan view of a portion of the machine, showing a modification thereof; Fig. 7 a rear end view of a portion of the machine showing said modification. Fig. 8, is a detail view of the cutting mechanism, shown in modification. Fig. 9 is a detail face view of a portion of the mechanism, at one side, for raising and lowering the main frame.

Referring to the drawings, the numeral 1 indicates the main frame of the harvester, which is mounted on wheels 2 located at each side thereof. At the front of said main frame and forming part thereof is located a vertical frame 3, the upper portion of which is extended forwardly, forming shafts between which a draft animal may be hitched, the forward, upper, cross bar of said frame, being provided with a single tree, to which traces may be attached. At each side and in front, the main frame, is provided with angular spaces to the oblique edges 7 of which are fastened the cutters or knives 5. These consist each of a blade, sharpened to a cutting edge at the front, and they are preferably made horizontally straight at their forward ends for a suitable distance and then bent at a quarter twist and carried upward to the sides of the machine, so as to give, initially, a direct cut and afterward a shear cut to the corn or cane stalks. The outer sides of the angular spaces are bounded by the forward, side projections 6 of the said main frame, and to the front extremities of these projections are attached the forward ends of the guides $7^a$, which are, preferably, constructed of metal rods, bent upwardly and backwardly, their rear ends being secured to uprights or standards 8, secured to said side projections.

To the central, vertical, frame of the machine, are secured rearwardly extending guides 9 which direct the stalks to the operators, and prevent the operators from falling in front of the knives; and from the rear of such vertical frame, at the lower portion thereof, are extended, rearwardly, the curved guides 10, the rear ends of which are bent downwardly and fastened in the platform. These guides serve to direct the butts of the stalks, rearwardly, and protect the feet of the operator.

The numeral 11 indicates a spring secured to the upright at each side of the main frame and extending rearwardly toward the knives or cutters, by means of which the stalks of the growing corn or cane are forced to the cutting edges thereof. The outer ends of the said knives or cutters do not extend quite to the forward side projections 6 of the machine and the spring arms 11 are so constructed as to extend over the outer ends of the cutters, a space being left between the cutters and the projections 6, for the discharge of weeds or refuse cut and gathered up by the knives, which would clog and impair the action of the machine. The construction is similar, when the vibrating cutter of the modification is used.

The main frame, at the rear of the platform, is provided with rearwardly extending frames 12 at each side, having vertical frames 13 secured thereto, the said frames 12 and 13 serving to support the troughs 14, for the reception of the cane collected by the operators. Midway between the two frames 12, a beam 14$^a$ is extended, rearwardly, from the platform of the main frame, and upon this and the platform is erected a vertical frame 15, to the upper rail of which are hinged movable wings 16, which form in connection with the wings 17, secured to the side frames 13, troughs or receptacles for the stalks, which troughs may be opened to drop the collected stalks to the ground in gavels when desired.

In order to enable the hinged wings to be conveniently operated a longitudinal movable bar 18 is set in bearings, on the upper side of the lower rail of the vertical frame, and at its forward end is connected by means of a link 19, with the lower end of a lever fulcrumed at 20 to the forward upright frame above mentioned. The said sliding rod is connected by lateral links 21 with the respective hinged wings, before mentioned, so as to move them as the said sliding rod is moved back or forth.

In the modification shown in Figs. 5, 6, and 7, of the drawings the wings are constructed of flat instead of curved plates, as shown in the said figures. The wing 16$^a$ is hinged at its lower edge, and at its rear end is provided with an arm 22 and slotted segment 23, through which passes a set screw into a bracket 24 by means of which the said wing may be adjusted to vary the capacity of the trough which it forms part. Also in the said modification instead of the spring arm 11 fastened to the upright of the side extension of the main frame, the said frame has fulcrumed to it a vibrating cutter which is arranged to oscillate laterally between guides 24 secured to the platform. The said cutter has a laterally projecting extension 25 bifurcated at its free end and provided with a downwardly extending stirrup, which are operated, by a crown wheel 26 having angular teeth, the said crown wheel being mounted on one of the supporting wheels of the machine so as to be rotated therewith.

The numeral 27 indicates a "horse" consisting of a beam of suitable material, movably mounted in bearings 28 on the top rail of the central vertical frame of the machine. The said "horse" is recessed at its lower edge near the front end, to engage and be held by a detent 29 on the rail, and is also provided with a pin 29$^a$ near its front end, to limit its backward movement.

The sides of the main frame, have secured to their outer edges, diametrically opposite each other, by means of bolts or screws 30, the plates 31, which may be moved upon the bolts which serve as a pivot. The forward ends of these plates are provided with a series of apertures, through which a screw 32 may be passed to hold the said plates in an adjusted position. The axle spindles 33 of the supporting wheels 2 are mounted upon the movable ends of these plates, serving to enable the main frame to be lowered or elevated as may be required.

The operation of the machine will be readily understood in connection with the above description and is as follows: As it is drawn forward between two rows of corn or cane, the stalks are gathered in to the angular spaces at each side of the machine, and directed to the edges of the cutting knives by the springs, or by the vibrating cutter of the modification. The stalks have their outer, hard shell broken by the direct action of the straight edges of the knives, and are afterward separated by a shear cut given by the oblique or rising portion thereof. The stalks then fall back to the operator or preferably, operators who are stationed at each side upon the platform and who transfer and deposit them in the troughs at either side, each of which is of a capacity to hold a portion of the shock, so as to permit the whole to be easily handled in binding the shock. If desirable hooks may be used to facilitate the gathering of the corn before it is cut, especially would this be of advantage if the corn is leaning or partially down as is frequently the case. As the machine is constructed it is evident that the shocks may be formed in quarters, halves or whole shocks as may be desired. When sufficient stalks have been gathered in the respective troughs, the machine is stopped, the operators go to the rear and remove the stalks, having previously drawn the "horse" to the rear. The stalks are rested against the "horse," and bound with a suitable wire or cord, after which the machine is moved on, drawing the horse out of the shock, when the "horse" may be pushed forward into its normal position. When the stalks are to be formed into shocks, the two troughs at each side are filled by the operators, each trough being of a capacity to contain a quarter of a shock, so that when the contents of all of the troughs are bound together a full or complete shock will be formed. When it is desired to drop the stalks in gavels, the central troughs alone are used and after a sufficient quantity is collected, in each, the hinged wings are dropped by means of the sliding bar and lever so as to deposit the stalks upon the ground.

When it is necessary to raise or lower the main frame, the screws 32 are removed, and the forward movable ends of the plates moved upward or downward as required, and the screws 32 reset, through higher or lower apertures.

Having thus described my invention, what I claim, and desire to secure by Letters Patent, is—

1. The combination with the stationary and hinged sides of the side trough, of an intermediate hinged wing, and means for holding it in an adjusted position, substantially as specified.

2. The combination with the main frame, of the guides, the cutting knives, the platform and the troughs, two of which are arranged at each side of the main frame, whereby the stalks may be collected in quantities to form quarter sections of a shock, substantially as specified.

3. In a corn and cane harvester, a diagonal cutter having its forward cutting edge straight and its rear edge curved upward, substantially as shown and described, whereby a direct cut is first made then a shearing cut.

4. In a corn and cane harvester, the combination with the main frame and platform, of the upper guards secured to the front part of said main frame and extending rearwardly partially over said platform, said guards having free rear ends, and suitable troughs arranged in pairs, at the rear of the platform behind the rear ends of the guards, one pair on each side of the longitudinal center line of the main frame, substantially as shown and described for the purpose set forth.

In testimony whereof I affix my signature in presence of two witnesses.

RICHARD B. ROBBINS.

Witnesses:
D. B. MORGAN,
JOHN GAHAGAN.